United States Patent [19]

Compeau et al.

[11] E Patent Number: Re. 33,758

[45] Reissued Date of Patent: Dec. 3, 1991

[54] CLOSURE PANEL PULL DOWN MECHANISM

[75] Inventors: David E. Compeau, Mt. Clemens; Howard W. Kuhlman, Troy; Lloyd W. Rogers, Jr., Utica, all of Mich.

[73] Assignee: General Motors Corporation, Detroit, Mich.

[21] Appl. No.: 413,579

[22] Filed: Sep. 28, 1989

Related U.S. Patent Documents

Reissue of:

[64] Patent No.: 4,746,153
Issued: May 24, 1988
Appl. No.: 52,914
Filed: May 22, 1987

[51] Int. Cl.[5] ..... E05C 13/06

[52] U.S. Cl. ..... 292/216; 292/229; 292/DIG. 43

[58] Field of Search ..... 292/216, 229, 280, 341.16, 292/341.17, 254, DIG. 43, 111, 201

[56] References Cited

U.S. PATENT DOCUMENTS

| | | | |
|---|---|---|---|
| 2,729,486 | 1/1956 | Evans | 292/254 X |
| 2,896,990 | 7/1959 | Garvey | 292/341.16 X |
| 2,903,288 | 9/1959 | Joachim et al. | 292/341.16 |
| 2,916,319 | 12/1959 | Du Bois | 292/341.16 |
| 2,943,880 | 7/1960 | Joachim | 292/201 |
| 2,994,550 | 8/1961 | White | 292/341.16 |
| 3,312,491 | 4/1967 | Peters | 292/201 |
| 3,403,934 | 10/1968 | Butts | 292/341.16 |
| 3,835,678 | 9/1974 | Meyer et al. | 292/341.16 |

FOREIGN PATENT DOCUMENTS

3333746A1 6/1985 Fed. Rep. of Germany .

*Primary Examiner*—Richard E. Moore
*Attorney, Agent, or Firm*—Charles E. Leahy

[57] ABSTRACT

A vehicle body compartment is selectively closed by a spring loaded closure panel movable between an open position and a closed position. A latch assembly is mounted on the panel and has a latch bolt spring biased to an unlatched position and normally maintained in the latched position by a key releasable detent lever. A pull down mechanism includes a housing mounted on a vehicle body and a striker mounted thereon by a motorized vertically reciprocating drive unit for moving the striker between extended position and a retracted position. When the panel is moved toward the closed position, the latch bolt engaes with the extended striker to interconnect the panel with the striker. The drive unit is energized and retracts the striker, thereby pulling the panel to its fully closed position. A cam acts between the detent lever of the latch assembly and the housing of the pull down mechanism. The cam acts upon motorized movement of the striker from its retracted position toward its extended position to cam the detent lever to the position releasing the latch bolt independently of key operated release thereof whereby the latch bolt is spring biased to the unlatched position thereby disconnecting the panel from the striker and freeing the panel for spring loaded movement to the open position.

5 Claims, 3 Drawing Sheets

CLOSURE PANEL PULL DOWN MECHANISM

Matter enclosed in heavy brackets [ ] appears in the original patent but forms no part of this reissue specification; matter printed in italics indicates the additions made by reissue.

The invention relates to a latch mechanism for a vehicle closure panel and more particularly provides a pull down mechanism for pulling the panel to the fully closed position.

BACKGROUND OF THE INVENTION

It is well known in the prior art to provide a vehicle body closure panel, such as a rear deck lid, which is hingedly mounted and spring loaded for movement to an open position. The latch assembly is mounted on the panel and has a latch bolt which is spring biased to an unlatched position. When the deck lid is slammed to a closed position, the latch bolt latches with a striker mounted on the vehicle body to latch the panel in the closed position. The latch assembly traditionally includes a detent lever which holds the latch bolt in the latched position and a key cylinder for releasing the detent lever from the latch bolt so that the latch bolt is spring biased to the unlatched position releasing the panel for movement to its open position.

It is also well known in the prior art to provide a motorized pull down latch mechanism for pulling the panel to the fully closed position, thereby eliminating the need for the user to slam the panel. The pull down mechanism traditionally includes a housing mounted on the vehicle body and having the striker mounted thereon by a motorized vertically movable drive unit for movement between an extended position and a retracted position. When the striker is extended, closing movement of the panel causes the latch bolt to engage the striker so that the panel and striker are latched together. This engagement closes a switch and energizes the motorized drive unit to retract the striker and thereby pull the panel to the fully closed position. When the panel is returned to the open position, by operating the key or by remote electrical operation from inside the passenger compartment, the motorized drive unit reverses and the striker is moved from the retracted position to the extended position in readiness for subsequent engagement by the latch bolt upon closing movement of the panel.

The present invention provides a new and improved mechanism for remotely unlatching the latch bolt from the striker to enable opening movement of the panel.

SUMMARY OF THE INVENTION

A vehicle body compartment is selectively closed by a spring loaded closure panel movable between an open position and a closed position. A latch assembly is mounted on the panel and has a latch bolt spring biased to an unlatched position and normally maintained in the latched position by a detent lever. A pull down mechanism includes a housing mounted on the vehicle body and having a striker mounted thereon by a motorized vertically reciprocating drive unit for moving the striker between extended and retracted positions. When the panel is moved toward the closed position, the latch bolt engages with the extended striker to interconnect the panel with the striker. The driver unit is energized and retracts the striker, thereby pulling the panel to its fully closed position. The latch assembly on the panel is unlatched by energizing the motor to move the striker toward the extended position. A cam acts between the detent lever of the latch assembly and the housing of the pull down mechanism to cam the detent lever to the position releasing the latch bolt in response to upward opening movement of the latch assembly by the striker whereby the latch bolt is spring biased to unlatch from the striker and thereby frees the panel for spring loaded movement to the open position.

BRIEF DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
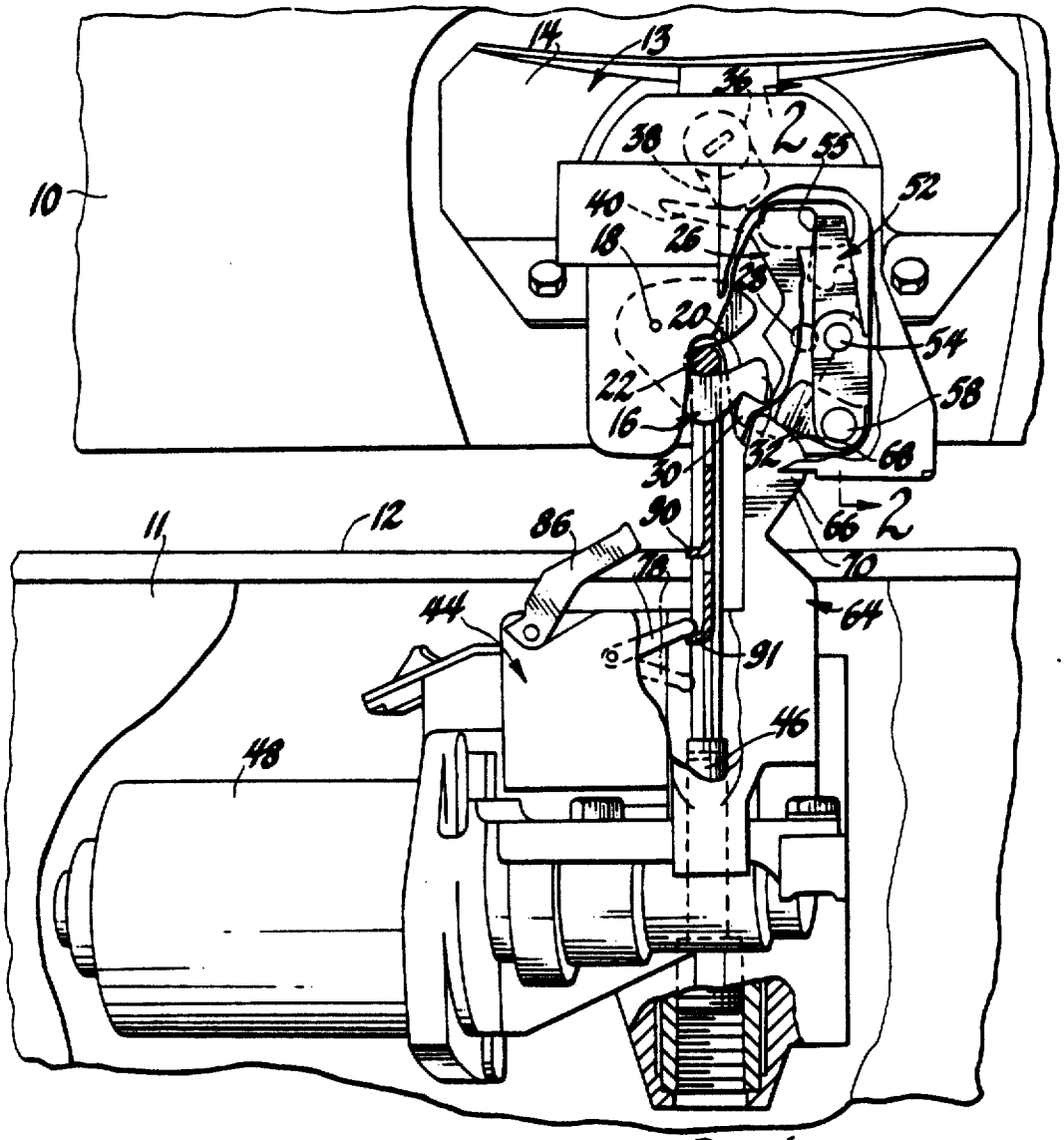
FIG. 1 is an elevation view of the compartment panel latch and the pull down mechanism, shown in the position in which the closure panel has been moved part way toward the closed position so that the latch assembly is engaged with the striker of the pull down unit.

Referring to FIG. 1, a deck lid closure panel of a vehicle body is indicated at 10. The panel is hingedly mounted on the vehicle body for movement between open and closed positions with respect to a vehicle compartment. The panel is spring loaded for movement to an open position with respect to the compartment.

FIG. 1 also shows a vehicle body panel 11 which defines the compartment opening 12 which is selectively closed by the closure panel 10.

Figure 2:
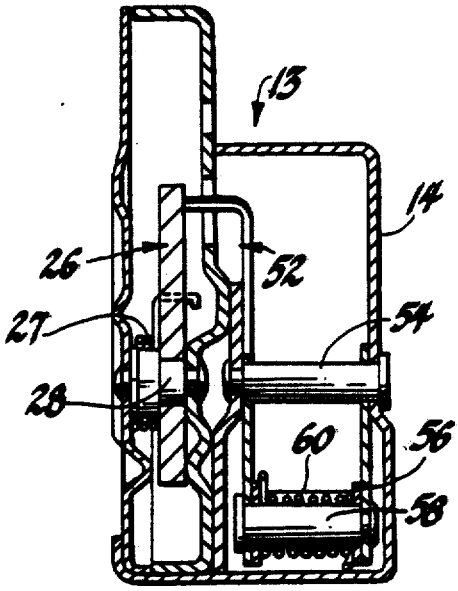
FIG. 2 is a sectional view taken in the direction of the arrows 2—2 of FIG. 1.

The closure panel 10 may be latched in a closed position by a latch assembly generally indicated at 13 which is mounted on the closure panel 10. The latch assembly 13 includes a housing 14 having a latch bolt 16 mounted thereon by pivot 18. The latch bolt 16 has an opening 20 by which the latch bolt 16 is engageable with a striker 22 carried by the body panel 11 to latch and interconnect the closure panel 10 with the body panel 11. The latch assembly 13 includes a spring, not shown, which biases the latch bolt 16 to an unlatched position shown in FIG. 5. As shown in FIGS. 1 and 2, the latch assembly 13 includes a detent lever 26 mounted on housing 14 by pivot 28 and having a hook 30 which engages with a hook 32 of the latch bolt 16 to hold the latch bolt 16 in a latched position with respect to the striker 22 as shown in FIG. 1. A spring 27, shown in FIG. 2, urges detent lever 26 to the position of FIG. 1.

The latch assembly 13 also includes a key operated lock cylinder 36 which is rotatable when a properly bitted key is inserted. The key cylinder carries a cam 38 which, upon rotation of the key cylinder 36, engages a cam follower portion 40 of the detent lever 26 to pivot the detent lever 26 about its pivot 28 and thereby disengage the detent lever hook 30 from the latch bolt hook 32 so that the spring, not shown, returns the latch bolt 16 to its unlatched position, thereby disconnecting the latch assembly 13 from the striker 22 and enabling the closure panel 10 to be moved to its open position by the closure panel spring.

Figure 4:
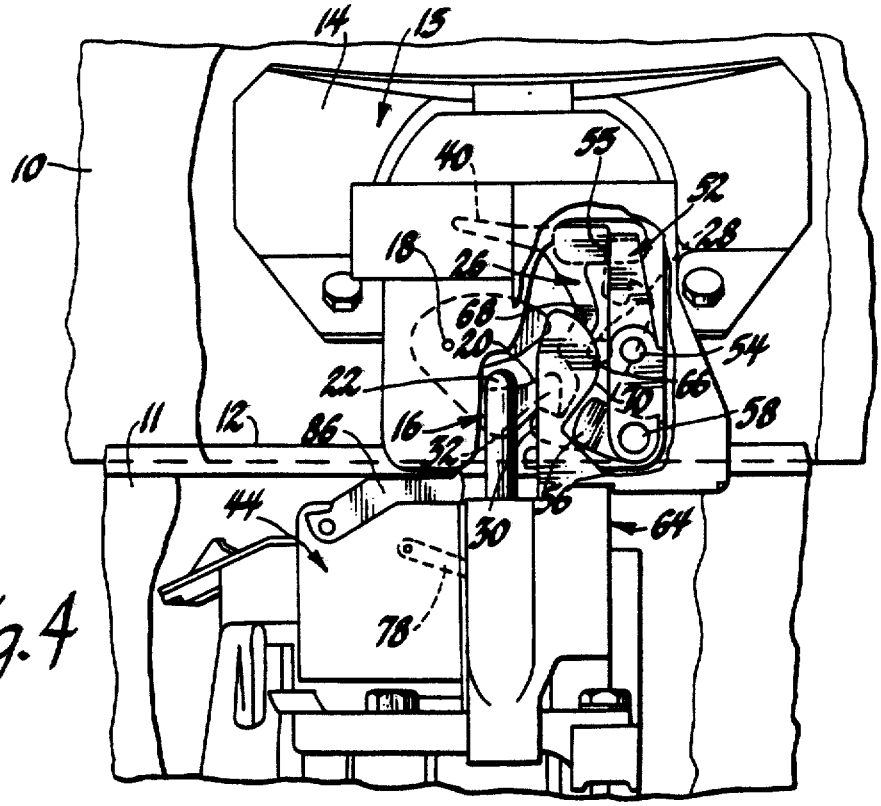
FIG. 4 is a view similar to FIGS. 1 and 3 but showing the panel in the latched and fully closed positions.

Referring again to FIG. 1, a pull down mechanism, generally indicated at 44, is provided for moving the closure panel 10 from its partially closed position of FIG. 1 to a fully closed position of FIG. 4. As best seen in FIG. 1, the striker 22 is mounted on a jackscrew 46. A reversible electric motor 48 is connected with the jackscrew 46 by a suitable mechanism including a drive nut which meshes with the jackscrew 46 to raise and lower the jackscrew 46 upon energization of the motor 48. The jackscrew 46 is movable in a vertically reciprocable fashion between the extended position of FIG. 1 and the retracted position of FIG. 4. In the retracted position of FIG. 4, the panel 10 is pulled down to its fully closed position in which the closure panel 10 seats upon a weatherstrip carried by the body panel 11.

A mechanism is provided to unlatch the latch assembly 13 from the striker 22 independently of the operation of the lock cylinder 36 discussed hereinbefore. As seen in FIGS. 1 and 2, the unlatching mechanism includes a release lever 52 which is pivotally mounted on the latch housing 14 by pivot 54. An upper end 55 of the release lever 52 engages against the detent lever 26. A follower link 56 is pivoted to the lower end of the release lever 52 by pivot 58. A torsion spring 60 encircles the pivot pin 58 and acts between the follower link 56 and release lever 52 to urge the follower member 56 to a normal position relative the release lever 52 as shown in FIGS. 1 and 4. The release mechanism also includes a cam member 64 which is fixedly mounted on the pull down mechanism 44 and extends upwardly therefrom and has a cam 66 thereon including an upper cam surface 68 and a lower cam surface 70.

Latch Operation

Figure 3:
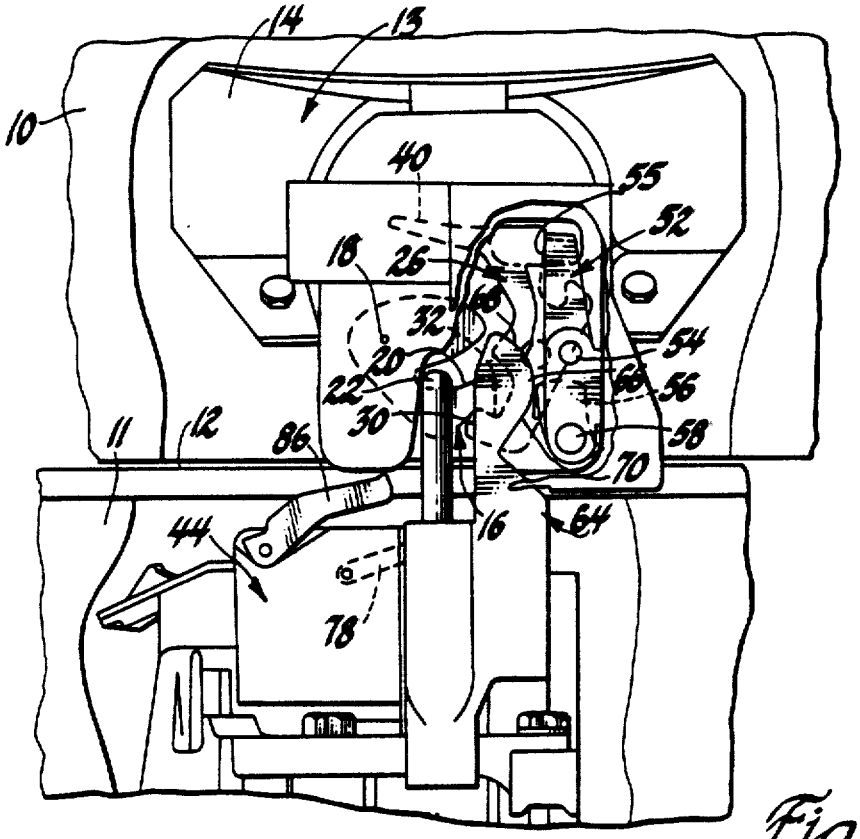
FIG. 3 is a partial view similar to FIG. 1 but showing the pull down mechanism retracting the striker and pulling the panel further toward its closed position.

Referring to FIG. 1, it is seen that the vehicle user has moved the closure panel 10 downwardly to carry the latch bolt 16 of latch assembly 13 into latching engagement with the striker 22. Latch bolt 16 has been rotated to its latching position in which the striker 22 is captured in the slot 20 of of latch bolt 16. Hook 30 of detent lever 26 engages with hook 32 of the latch bolt 16 to retain the latch bolt 16 at the latched position. Downward retracting movement of the jackscrew 46 by the motor 48, pulls the panel 10 downwardly as shown in FIG. 3 and causes the follower link 56 to wipe over the upper surface 68 of cam member 64 as the panel 10 is pulled downwardly to the partly closed position as shown in FIG. 3.

FIG. 4 shows the panel 10 pulled all the way down to the closed position in which the follower link 56 rests against the cam member 64. Thus it is seen that the movement of the panel 10 from the position of FIG. 1 toward the fully closed position of FIG. 4 causes the follower link 56 to ride over the cam 66 of cam member 64 without influencing the normal spring biased position of the release lever 52.

Figure 5:
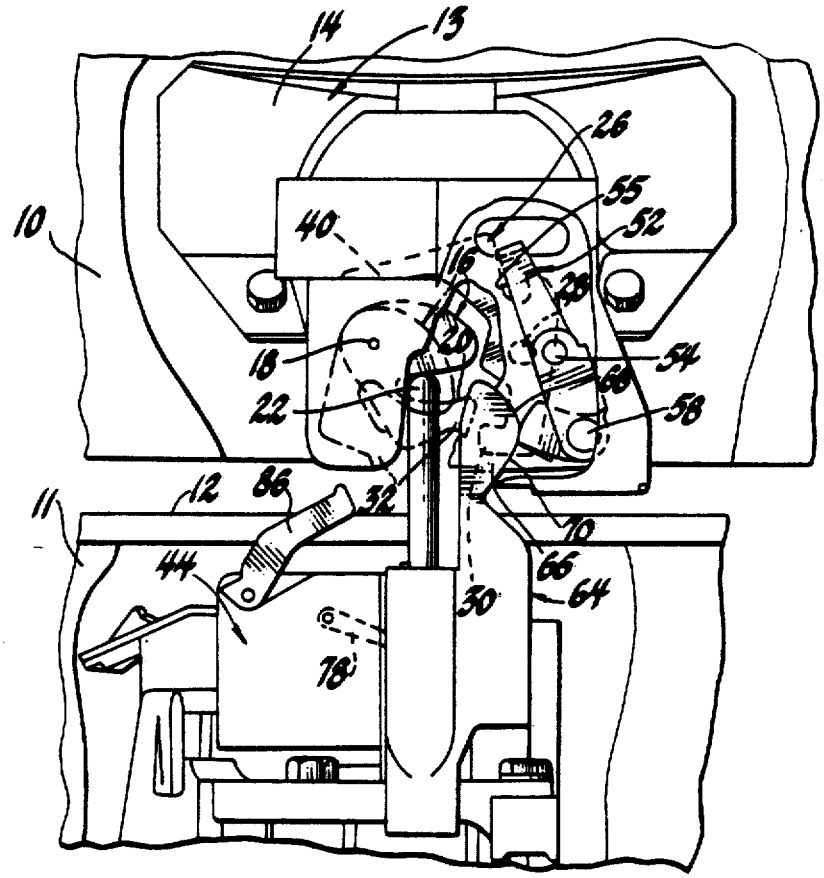
FIG. 5 is a view similar to FIG. 1 but showing the movement of the panel from the FIG. 4 latched position toward the open position and the unlatching of the latch assembly by a cam means and release lever acting between the pull down mechanism and the latch assembly.

Referring to FIG. 5, it will be understood that unlatching of the latch assembly 13 from the striker 22 in order to enable opening movement of the panel 10, is initiated by reversing the direction of rotation of the motor 48 so that the jackscrew 46 carrying the striker 22 is extended upwardly from the FIG. 4 position to the FIG. 5 position. The upward extending movement of the striker 22 raises the latch assembly 13 and closure panel 10 so that the follower link 56 engages upon the lower surface 70 of the cam 66 to pivot the release lever 52 about its pivot 54 as shown in FIG. 5. This pivoting movement of the release lever 52 causes the upper end 56 of the release lever 52 to pivot the detent lever 26 about its pivot 28, thereby disengaging the detent lever hook 30 from the fork bolt hook 32. With this disengagement, the latch bolt 16 is permitted to begin pivoting about its pivot 18 by its spring to the phantom line indicated unlatched position of FIG. 5 in which the latch bolt 16 is disengaged from the striker 22. Thus the spring associated with the hinge of the panel 10 is permitted to move the closure panel 10 to the fully open position.

Electrical Control of the Motor

Figure 6:
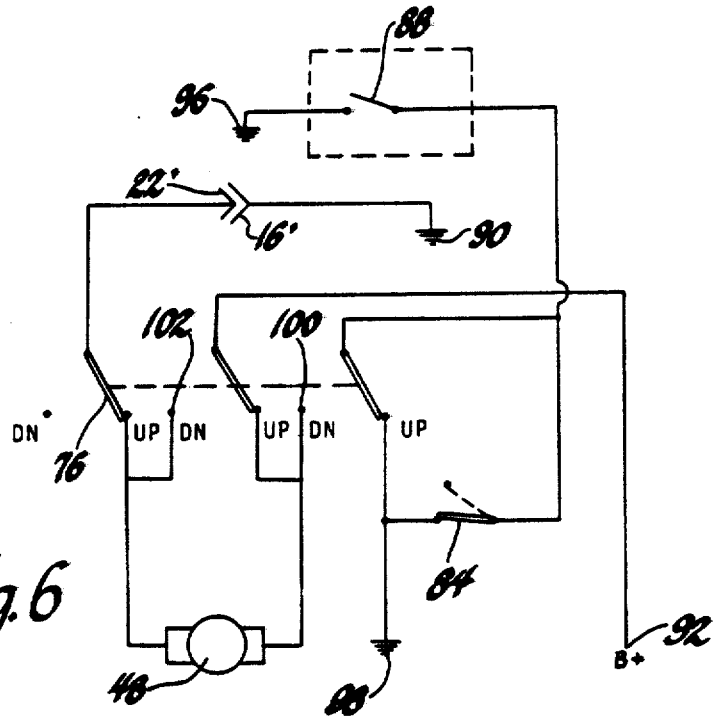
FIG. 6 is an electrical circuit suited for operating the pull down.

Referring to FIG. 6 there is shown electrical circuitry for controlling the pull down motor 48 in the manner to obtain the pull down and releasing operations described hereinbefore.

When the panel 10 is moved from the fully open position to the position of FIG. 1, the contact of the fork bolt 16 with the striker 22 completes an electrical connection as represented by the contacts 16' and 22' in the electrical circuit of FIG. 6. The circuit also includes a switch 76 operated by a lever 78 mounted on the pull down unit 44. Lever 78 is engaged by an upper switch operator 90 and a lower switch operator 91 carried by the jackscrew 48 of the striker 22. The switch 76 has contacts designated DN which are closed when the striker reaches the fully retracted position of FIG. 4 in which the upper switch operator 90 has depressed the switch lever 78. The switch 76 also has contacts labeled UP which are closed when the striker reaches the raised position of FIG. 1. A second switch 84 is operated by a lever 86 which is spring biased to the raised position shown in FIGS. 1, 3 and 5. When the closure panel reaches the closed position as shown in FIG. 4, the switch 84 is open and when the closure panel is in the positions of FIGS. 1, 3 and 5, the switch is closed. The electrical circuit also includes a normally open switch 88 mounted remotely from the pull down unit, preferably inside the passenger compartment glove box.

In operation, when the panel 10 is moved from the fully open position to the position of FIG. 1, the contacts 16' and 22' are closed by the engagement of the latch bolt 16 with the striker 22. This closes the circuit from battery 92 through the contacts labeled UP of the switch 76 to the motor 48, and to the ground 90. Accordingly the motor 48 is energized in the direction to retract the striker 22 downwardly to pull the panel 10 from the FIG. 1 position down to the FIG. 3 position and then to the FIG. 4 fully closed position.

As seen by comparing FIGS. 1 and 4, the closing movement of the panel 10 causes the operator 90 carried by striker 22 to engage and move the switch lever 78 downwardly thereby operating the switch 76 of FIG. 6 to open the contacts labeled UP so that the connection between battery 92 and ground 96 is broken and the motor 48 is stopped. This operation of the switch lever 76 simultaneously closes the contacts labeled DN. Furthermore, as seen in comparing FIGS. 3 and 4, the closing movement of the closure causes latch assembly 13 to operate the switch lever 86, thereby moving the switch 84 from its closed position shown in FIG. 6 to the open position.

When the user desires to open the deck lid from inside the passenger compartment, the switch 88 located inside the glove box is momentarily closed. This momentary closure of switch 88 allows current to flow from battery 92 to the DN contacts, and motor 48 to the ground 96. This energizes the motor 48 in the direction to extend the striker 22 upwardly as shown in FIG. 5 so that the cam member 64 and release lever 52 will function to unlatch the latch assembly 13 as described hereinbefore. The initial upward movement of the latch assembly 13 with the closure panel 10 operates the switch lever 86 to move the switch 84 to the closed position, thereby continuing the energization of motor 48 through ground 98 after the operator releases switch 88. After the striker 22 has extended to its fully extended position beyond that shown in FIG. 5 to assure unlatching of the latch assembly 13, the switch lever 78 is operated by the lower switch operator 91 to move the switch 76 from the DN contacts to the UP contacts, thus resetting the circuit for subsequently pulling the panel 10 to closed position.

Thus it is seen that the invention provides a new and novel closure panel pull down mechanism in which a cam acts between the detent lever of the latch assembly and the housing of the pull down mechanism and acts upon motorized movement of the striker from its retracted position toward its extended position to cam the detent lever to the position releasing the latch bolt whereby the latch bolt is spring biased to unlatch from the striker and thereby frees the panel for spring loaded movement to the open position.

The embodiment of the invention in which an exclusive property or privilege is claimed is defined as follows:

1. In a vehicle body including a compartment panel spring-loaded for movement between open and closed positions with respect to a compartment defined by a body panel, a latch and pull down mechanism comprising:

a latch assembly mounted on one of the panels and having a latch bolt spring biased to an unlatched position and a detent lever for holding the latch bolt in the latched position;

a pull down mechanism mounted on the other panel and including a striker mounted thereon by a motorized drive unit for movement between an extended position where the striker is engageable by the latch bolt of the latch assembly to latch the panels together upon partial closing movement of the closure panel, and a retracted position in which the closure panel is in the closed position;

means adapted to operate the motorized drive unit to move the striker to retracted position to pull the closure panel to the closed position in response to latching engagement between the striker and the latch assembly, remote opening means actuable by the user for selectively operating the mounted drive unit to move the striker from the retracted position toward the extended position, and cam means acting in response to motorized movement of the striker from its retracted position toward its extended position to cam the detent lever to a position releasing the detent lever from the latch bolt whereby the latch bolt is spring biased to the unlatched position thereby disconnecting the latch assembly from the striker and freeing the compartment panel for spring-loaded movement to the open position.

2. In a vehicle body including a compartment panel spring-loaded for movement to an open position and movable to a closed position, latch and pull down mechanism comprising:

a latch assembly mounted on the panel and having a latch bolt spring biased to an unlatched position and a key releasable detent lever for holding the latch bolt in a latched position;

a pull down mechanism including a housing mounted on the vehicle body and a striker mounted thereon by a motorized vertically reciprocating drive unit for movement between an extended position where the striker is engageable by the latch bolt to latch the panel to the striker upon partial closing movement of the panel and a retracted position in which the striker positions the panel in the closed position;

remote panel opening means actuable by the user for selectively energizing the drive unit to move the striker from the retracted position toward the extended position;

and cam means acting between the detent lever of the latch assembly and the housing, said cam means coacting therebetween upon motorized movement of the striker from its retracted position toward its extended position to cam the detent lever to a position releasing the detent lever from the latch bolt independently of the key release thereof whereby the latch bolt is spring biased to the unlatched position thereby disconnecting the panel from the striker and freeing the compartment panel for spring-loaded movement to the open position.

3. In a vehicle body including a compartment panel spring-loaded for movement to an open position and movable to a closed position, a latch and pull down mechanism comprising:

a latch assembly mounted on the panel and having a latch bolt spring biased to an unlatched position and a key releasable detent lever for holding the latch bolt in a latched position;

a pull down mechanism including a housing mounted on the vehicle body and a striker mounted thereon by a motorized vertically reciprocating drive unit for movement between an extended position where the striker is engageable by the latch bolt to latch the panel to the striker upon partial closing movement of the panel and a retracted position in which the striker positions the panel in the closed position;

remote panel opening means actuable by the user for selectively energizing the drive unit to move the striker from the retracted position toward the extended position;

cam means carried by the housing;

and a release lever carried by the latch assembly and adapted to actuate the detent lever and release the latch bolt to the unlatched position, said release lever operatively engaging the cam means upon motorized movement of the striker toward its extended position to thereby actuate the detent lever independently of the key release thereof whereby the latch bolt is spring biased to the unlatched position freeing the panel for movement to the open position.

*4. In a vehicle body including a compartment panel spring-loaded for movement between open and closed posi-*

*tions with respect to a compartment defined by a body panel, a latch and pull down mechanism comprising:*

*a latch assembly mounted on one of the panels and having a latch bolt spring biased to an unlatched position and a detent lever for holding the latch bolt in the latched position;*

*a striker assembly mounted on the other panel and adapted for engagement by the latch bolt of the latch assembly to latch the striker assembly to the latch assembly;*

*a pulldown mechanism mounting one of said assemblies on its associated panel and having a motorized drive unit for moving said one assembly between an extended position where the striker and the latch bolt are engaged together upon partial closing movement of the closure panel, and a retracted position in which the closure panel is in the closed position;*

*means adapted to operate the motorized drive unit to move said one assembly to the retracted position to pull the closure panel to the closed position in response to latching engagement between the striker and the latch bolt;*

*remote opening means actuatable by the user for selectively operating the motorized drive unit to move said one assembly from the retracted position toward the extended position;*

*and cam means acting in response to motorized movement of said one assembly from its retracted position toward its extended position to cam the detent lever to a position releasing the detent lever from the latch bolt whereby the latch bolt is spring biased to the unlatched position thereby disconnecting the latch assembly from the striker and freeing the compartment panel for spring-loaded movement to the open position.*

*5. The combination of claim 4 in which the pull down mechanism is mounted on a housing and the cam means includes a cam mounted on the housing and a release lever associated with the detent lever of the latch assembly and engaging with the cam to act in cooperation to release the detent lever.*

* * * * *